United States Patent [19]

Edahiro et al.

[11] Patent Number: 4,975,102
[45] Date of Patent: Dec. 4, 1990

[54] OPTICAL TRANSMISSION FIBER AND PROCESS FOR PRODUCING THE SAME

[75] Inventors: Takeo Edahiro, Ibaraki; Shiro Kurosaki; Minoru Watanabe, both of Kanagawa, all of Japan

[73] Assignees: Nippon Telegraph & Telephone Public Corporation, Tokyo; Sumitomo Electric Industries, Ltd., Osaka, both of Japan

[21] Appl. No.: 262,095

[22] Filed: Oct. 19, 1988

Related U.S. Application Data

[63] Continuation of Ser. No. 850,437, Apr. 8, 1986, abandoned, which is a continuation of Ser. No. 617,865, Jun. 6, 1984, abandoned, which is a continuation of Ser. No. 521,287, Aug. 8, 1983, abandoned, which is a continuation of Ser. No. 200,351, Oct. 24, 1980, abandoned.

[30] Foreign Application Priority Data

Oct. 25, 1979 [JP] Japan .................................. 54-137012
Feb. 28, 1980 [JP] Japan .................................. 55-23359

[51] Int. Cl.$^5$ ................................ C03C 25/02
[52] U.S. Cl. ........................................ 65/3.12; 65/13; 65/18.2; 501/12; 350/96.3
[58] Field of Search .................. 65/3.12, 13, 18.2; 501/12; 350/963, 96.33

[56] References Cited

U.S. PATENT DOCUMENTS

| | | | |
|---|---|---|---|
| 4,045,198 | 8/1977 | Rau et al. | 65/3.12 |
| 4,165,152 | 8/1979 | Shiraishi et al. | 350/96.30 |
| 4,188,089 | 2/1980 | Gliemeroth et al. | 65/3.12 |
| 4,221,825 | 9/1980 | Guerder et al. | 65/3.12 |
| 4,243,298 | 1/1981 | Kao et al. | 350/96.33 |

Primary Examiner—David Simmons
Assistant Examiner—Lori-Ann Johnson
Attorney, Agent, or Firm—Sughrue, Mion, Zinn, Macpeak & Seas

[57] ABSTRACT

An optical transmission fiber comprising (1) a core of high refractive index composed of $SiO_2$-based glass containing at least one of $GeO_2$, $As_2O_3$, $Sb_2O_5$, $SnO_2$, $TiO_2$, $PbO$ and $Bi_2O_3$, (2) a clad of low refractive index composed of $SiO_2$-based glass containing at least one of $B_2O_3$, F, $F/B_2O_3$ and $F/P_2O_5$, and (3) an outermost jacket layer composed of $SiO_2$ and/or $SiO_2$-based glass containing at least one of $Al_2O_3$, $TiO_2$, $ZrO_2$ and $HfO_2$.

7 Claims, 1 Drawing Sheet

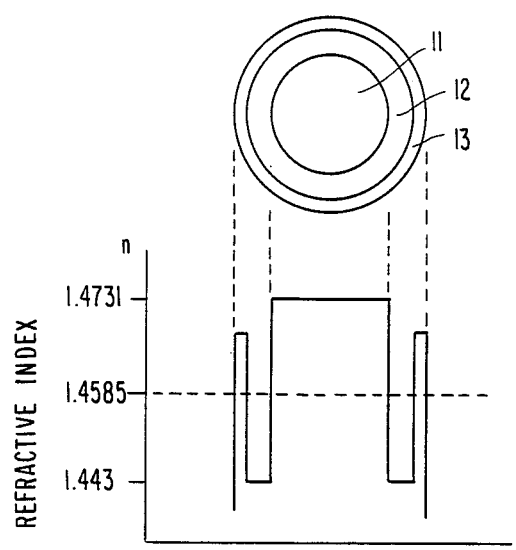

OPTICAL TRANSMISSION FIBER AND PROCESS FOR PRODUCING THE SAME

This is a continuation of application Ser. No. 06/850,437, filed Apr. 8, 1986 now abandoned, which is a continuation of application Ser. No. 06/617,865, filed Jun. 6, 1984 now abandoned, which is a continuation of Ser. No. 06/521,287, filed Aug. 8, 1983 now abandoned, which is a continuation of Ser. No. 06/200,351, filed Oct. 24, 1980 now abandoned.

BACKGROUND OF THE INVENTION

1. Field of the Invention

This invention relates to an optical transmission fiber and to a process for producing the same.

2. Description of the Prior Art

Remarkable advances have been made in the development of low loss optical fiber for use in long-distance optical communications and commercial production of such fiber has already begun. The fiber uses a light-emitting diode (LED) or laser diode (LD) as a light source and is designed to permit low-loss, broad-band transmission. For this purpose, the fiber comprises a core having a diameter up to 50 $\mu$m and a cladding having a refractive index that differs from that of the core by only about 1%.

An optical fiber has several advantages, such as lack of susceptibility to external induction, flexibility, light weight and large-capacity transmission. To take full advantage of these advantages, applications of optical fibers are expanding to computers, instrumentation, control systems and graphic communications. In these applications, there is a great demand for reducing the cost of manufacturing a transmission system comprising a light source, optical fibers and a light receiver or a system comprising such a transmission system plus branches and multiplexer circuits. Such systems use an inexpensive LED as a light source and achieve low system transmission loss by reducing the transmission loss in the coupling of the light source and the optical fiber. Needless to say, the fibers used in these systems must have high practical strength, and an equally important requirement is that the fibers have low transmission loss. Therefore, there is a demand for an optical fiber that does not have a transmission loss per kilometer of more than 10 dB, has a core diameter of about 100 $\mu$m and is characterized by a differential refractive index between the core and cladding of about 2%. Conventionally, an optical fiber that is supposed to meet the demand has been produced in the following manner:

a powder of a core glass ($P_2O_5$-$GeO_2$-$SiO_2$) is laid over the starting member by flame hydrolysis and outside vapor-phase oxidation (OVPO) process, and the core glass is further overlaid with a powder of a cladding glass ($B_2O_3$-$SiO_2$). After removing the starting member, the laminate is sintered and collapsed to provide a preform which is spun into a fiber. The fiber produced by such method is characterized by a core composed of a $GeO_2$-$SiO_2$ or $GeO_2$-$P_2O_5$-$SiO_2$ glass having a diameter of 100 $\mu$m plus a cladding composed of a $B_2O_3$-$SiO_2$ glass which, when having a diameter of 140 $\mu$m (core diameter+clad diameter), provides a refractive index that differs from that of the core by about 2%. It is common practice to control the refractive indices of the core and cladding by mixing a dopant such as $GeO_2$, $B_2O_3$ or $P_2O_5$ with the primary material $SiO_2$. A high refractive index can be obtained using dopants such as $P_2O_5$, $GeO_2$, $Al_2O_3$ and $TiO_2$, but the only oxide available as a dopant for providing a low refractive index is $B_2O_3$. A dopant has an effect on physical properties other than the refractive index of the primary material $SiO_2$; it reduces the viscosity and increases the thermal expansion coefficient of pure $SiO_2$ glass to which it is added. Therefore, if the core is doped with a large amount of $GeO_2$ or $P_2O_5$ in an attempt to increase the refractive index of the core, the viscosity of the core glass is reduced and the thermal expansion coefficient of the core glass is increased. Since the difference in residual stress between the core and cladding must be reduced to a minimum, the viscosity and thermal expansion coefficient of the cladding must be controlled so as to offset the change resulting from the decreased viscosity and increased thermal expansion coefficient of the core. Therefore, if the core is doped with a large amount of $P_2O_5$ or $GeO_2$ to increase the refractive index of the core, the cladding is likewise doped with a large quantity of $B_2O_3$, but then the reduced viscosity and increased thermal expansion coefficient provide an optical fiber of low strength. In addition, the $B_2O_3$-$SiO_2$ glass of which the outer cladding has low water resistance and great static fatigue in a moist or humid atmosphere is experienced. As mentioned above, $B_2O_3$ is the only oxide dopant to provide a low refractive index. Thus, the cladding of all conventional optical fibers contains $B_2O_3$ and hence has low water resistance.

One may say this problem can be solved by covering the cladding with a water-resistant glass jacket, but this idea is impractical because the state-of-art technology can seldom furnish a water-resistant glass composition whose viscosity and thermal expansion coefficient agree with those of a soft core and cladding containing a large quantity of dopant.

SUMMARY OF THE INVENTION

The optical fiber of this invention is characterized by the following: the difference in refractive index between the core and cladding is about 2%; the use of a dopant is minimized to retain the desired hardness of the core and the cladding; a dopant such as $P_2O_5$ or $B_2O_3$ that reduces the viscosity of glass is not used to provide a viscosity and thermal expansion coefficient as close as is possible to those of pure $SiO_2$ glass thereby permitting the use of a jacket having a low thermal expansion coefficient and which has a viscosity equal to or slightly less than that of the core or cladding during melt-spinning; and the overall result is increased strength of the fiber.

The fiber of this invention comprises:

(1) a section of $SiO_2$-based glass containing at least one of $GeO_2$, $As_2O_3$, $Sb_2O_5$, $SnO_2$, $TiO_2$, PbO and $Bi_2O_3$ and having a high refractive index, (2) a section of $SiO_2$-based glass containing at least one of $B_2O_3$, F, $B_2O_3$/F and $P_2O_5$/F and having a low refractive index, and (3) an outermost layer of $SiO_2$ or $SiO_2$-based glass containing at least one of $Al_2O_3$, $TiO_2$, $ZrO_2$ and $HfO_2$.

The fiber of this invention can be produced by the following procedure: forming a transparent glass rod composed of $SiO_2$-based glass containing at least one of $GeO_2$, $As_2O_3$, $Sb_2O_5$, $SnO_2$, $TiO_2$, PbO and $Bi_2O_3$ by either the vapor-phase axial deposition (VAD) process or the OVPO process, overlaying the rod with molten $SiO_2$-based glass doped with $B_2O_3$, $SiO_2$-based glass doped with F, $SiO_2$-based glass doped with F and $B_2O_3$ and $SiO_2$-based glass doped with F and $P_2O_5$, covering the laminate with molten glass composed of $SiO_2$ and/or $Al_2O_3$-$SiO_2$, $TiO_2$-$SiO_2$, $ZrO_2$-$SiO_2$ or $HfO_2$-$SiO_2$, and melt-spinning the resulting preform of the transparent glass rod to produce a fiber.

BRIEF DESCRIPTION OF THE DRAWINGS

The FIGURE shows a cross section of the fiber according to this invention and the refractive index distribution chart of the fiber.

DETAILED DESCRIPTION OF THE INVENTION

By reference to the figure, a core 11 is composed of $SiO_2$ glass that provides adequate hardness to the core and which contains a dopant, such as $GeO_2$, $As_2O_3$, $Sb_2O_5$, $SnO_2$, $TiO_2$, PbO or $Bi_2O_3$ to provide a high refractive index, for example, $GeO_2$-$SiO_2$, $As_2O_3$-$SiO_2$, $SnO_2$-$SiO_2$, $Sb_2O_5$-$SiO_2$, $TiO_2$-$SiO_2$, PbO-$SiO_2$ and $Bi_2O_3$-$SiO_2$ systems. Table 1 below shows the melting point, viscosity and thermal expansion coefficient of typical examples of the above systems. As is apparent from Table, these systems have a lower melting point, viscosity and thermal expansion coefficient that other glass systems.

TABLE 1

| | $SiO_2$ | $TiO_2$—$SiO_2$ | $GeO_2$—$SiO_2$ | $As_2O_3$—$SiO_2$ | $SnO_2$—$SiO_2$ | $Sb_2O_5$—$SiO_2$ | $B_2O_3$—$SiO_2$ | $P_2O_5$—$SiO_2$ |
|---|---|---|---|---|---|---|---|---|
| Amount of Dopant (wt %) | | 10% | 10% | 10% | 10% | 10% | 10% | 10% |
| Refractive Index | 1.458 | 1.490 | 1.473 | — | 1.475 | 1.478 | 1.457 | 1.464 |
| Melting Point (°C.) | 1,713 | 1,690 | 1,650 | 1,550 | 1,670 | 1,600 | 1,410 | 1,400 |
| Viscosity | Hard | Hard | Hard | Fairly hard | Hard | Fairly hard | Soft | Soft |
| Thermal Expansion Coefficient | $5.5 \times 10^{-7}$ | $12 \times 10^{-7}$ | $11 \times 10^{-7}$ | — | — | — | $13 \times 10^{-7}$ | — |

There are two other dopants that can provide high refractive index, i.e., $Al_2O_3$ and $Ga_2O_3$, but if they are used in a large amount, they crystallize and devitrification of the glass occurs.

A cladding 12 as shown in the FIGURE is composed of $SiO_2$ doped with a small amount of F and/or $B_2O_3$. The glass composition of $SiO_2$ doped with F is such that part of the oxygen is replaced by F to provide a refractive index lower than that of pure $SiO_2$. However, the physical constants (i.e., melting point, viscosity and thermal expansion coefficient) of the F-doped $SiO_2$ glass are almost the same as those of pure $SiO_2$. On the other hand, $SiO_2$ doped with $B_2O_3$ does not provide a very low refractive index, and instead, the melting point and viscosity of such as glass decrease and the thermal expansion coefficient of such a glass increases. Combining the two dopants provides a glass composition having suitable physical constants. If desired, $B_2O_3$ may be replaced by $P_2O_5$. Since $P_2O_5$ provides slightly increased refractive index, $B_2O_3$ is preferred as a dopant for providing a low refractive index, but one advantage of using $P_2O_5$ is that a small amount of $P_2O_5$ lowers the softening point of the glass to a greater degree than does $B_2O_3$ and preform-making and drawing operations are easy. The composition of the jacket glass is determined by the softness of the core and cladding. If the composition of the core and cladding is close to that of pure $SiO_2$, the jacket may be composed of $SiO_2$ glass, but if the core or cladding is rather soft, a dopant may be used to provide a jacket having a viscosity substantially the same as that of the core or cladding. In this case, the refractive index of the jacket is selected at a value higher than that of the cladding, whereas the thermal expansion coefficient of the jacket is selected at a value slightly lower than that of the core cladding. This way the core, cladding and jacket provide matched viscosity resistance upon melting, hence easy spinning is achieved. The jacket glass becomes sufficiently soft upon melting to provide a smooth surface, whereas the thermal expansion coefficient of the jacket glass is so small that when the laminate of the core, cladding and jacket is spun into a fiber, residual compressive stress develops on the surface and fiber is mechanically strong and less susceptible to fatigue failure. As a further advantage, the difference in refractive index between the core and cladding can be increased to a satisfactory degree provided that the refractive index of the jacket is not smaller than that of the cladding. An $SiO_2$-based glass containing at least one of $Al_2O_3$, $TiO_2$, $ZrO_2$ and $HfO_2$ can be used with advantage as a composition which is water-resistant and meets the above defined requirements of viscosity, refractive index and thermal expansion coefficient. The jacket may be provided with a light-absorbing function by, for example, incorporating a suitable amount of a transition metal such as $Fe_2O_3$. The jacket may consist of an inner $SiO_2$ glass layer and an outer $SiO_2$-based glass layer containing at least one of $Al_2O_3$, $TiO_2$, $ZrO_2$ and $HfO_2$. One example of the composition of a fiber providing the refractive index distribution shown in the figure is a core 11 composed of an $SiO_2$-glass doped with 10 wt % of $GeO_2$, a cladding 12 composed of an $SiO_2$-based glass doped with 3 wt % of F and a jacket 13 composed of an $SiO_2$-based glass doped with 3 wt % of $TiO_2$.

Two specific methods of producing the fiber of this invention are described hereunder, but it is to be understood that the fiber of this invention can be produced by other methods.

First, glass for the section of high refractive index is made as follows: a halide such as $SiCl_4$ or $GeCl_4$, a hydride such as $SiH_4$ or $GeH_4$, or an organic compound such as $Si(OC_2H_5)_4$ or $Ge(OC_2H_5)_4$ is supplied as a vapor into an $H_2$-$O_2$ flame or $C_mH_n$-$O_2$ flame to cause a reaction that forms finely divided $GeO_2$-$SiO_2$ glass, which is grown axially on a mandrel of silica glass (VAD process) or grown radially on a mandrel coated with carbon powder (OVPO process), thereby providing finely divided glass. The glass particles made by the VAD process are sintered as such and collapsed to form a transparent $GeO_2$-$SiO_2$ glass rod. The starting material is removed from the glass particles made by the OVPO process before the particles are sintered and collapsed to form a transparent $GeO_2$-$SiO_2$ glass rod. The glass rod thus prepared is optionally ground and polished to provide a perfect cylinder, which is washed with hydrofluoric acid, hydrochloric acid, nitric acid, phosphoric acid or sulfuric acid before it is subjected to the subsequent steps.

In the next step, $H_2O$, HCl, $Cl_2$, HF or $F_2$ gas or a gaseous fluorine-containing compound such as $SF_6$, $CF_4$ or $CCl_2F_2$ is supplied into a high-frequency plasma flame together with, optionally, helium or oxygen gas to form a plasma flame which is applied to the rotating glass rod to perform flame-polishing by moving the flame longitudinally over the glass rod [plasma outer deposition (POD) process]. Subsequently, if $SiF_4$, $SF_6$, $CF_4$ or $CCl_2F_2$ is supplied with oxygen gas, a halide such as $SiCl_4$ or a hydride such as $SiH_4$ or an organic compound such as $Si(OC_2H_5)_4$ is supplied in a gaseous form into a high-frequency plasma flame as an $SiO_2$ forming material to form $SiO_2$ glass of a low refractive index doped with F. The resulting glass is grown in a molten state on the periphery of the glass rod serving as the section of a high refractive index. $SiO_2$ glass doped with $B_2O_5$ as well as F can be produced by supplying both the gas serving as an $SiO_2$ forming material and the gas of a halide such as $BCl_3$ or $BF_3$, a hydride such as $B_2H_6$, or an organic compound such as $Si(OCH_3)_3$. To produce $SiO_2$ glass doped with $P_2O_5$ as well as F, both the gas serving as the $SiO_2$ forming material and the gas of a halide such as $POCl_3$ or $PF_3$, a hydride such as $PH_3$, or an organic compound such as $P(OCH_3)_5$ can be supplied.

To form a glass serving as a jacket, the gas serving as the $SiO_2$ forming material is supplied at a controlled rate and the gas serving as a dopant, such as $TiCl_4$, $AlCl_3$, $ZrCl_4$ or $HfCl_4$, is supplied at a controlled rate. In this case, the supply of the gaseous F-containing compound is stopped, and if co-doping of F and $B_2O_3$ was performed in the previous stage, the supply of the dopant gases is also stopped.

The $SiO_2$ glass thus formed which contains a dopant such as $TiO_2$ is grown in a molten state on the periphery of the layer of low refractive index. In this manner, a preform comprising the core which is overlaid with the cladding and the jacket in that order is prepared. This method requires careful temperature control to prevent the formation of seeds and blisters due to excessive heating of the core. If a seed or blister is found to develop in the core which is being overlaid with a cladding, a small amount of $B_2O_3$ must be used as a co-dopant to produce molten glass at a relatively low temperature, and it is also necessary to use an increased amount of a dopant in the material for a jacket to again produce molten glass at a relatively low temperature.

Another method of producing the optical fiber of this invention is as follows.

First, a silica glass tube is supplied with gases serving as material for glass (the same as described above) and heated externally (modified CVD process) or internally (plasma CVD process) to cause a reaction that forms a deposit of either $F$-$SiO_2$, $F$-$B_2O_3$-$SiO_2$ or $F$-$P_2O_5$-$SiO_2$ glass on the internal wall of the tube. A glass rod serving as a section of a high refractive index having the same composition as defined above is inserted into the tube, which is set on a glass lathe and heated externally to collapse around the insert to form an integral composite glass rod. If desired, a technique identical to that described above can be used to coat the rod with $SiO_2$ glass containing either $Al_2O_3$, $TiO_2$, $ZrO_2$ or $HfO_2$, thereby make a preform of a transparent glass rod. The preform is then melt-spun into a fiber.

One preferred embodiment of the process for producing the optical fiber of this invention is described below. Four preforms were prepared by the OVPO process, the VAD process and the process of this invention. Each preform was spun into a fiber, and immediately thereafter, the fiber was primed with a silicone resin in a thickness of 150 $\mu$m and extrusion-coated with nylon to provide a total diameter of 0.9 mm. The construction, transmission characteristics and strength of each fiber produced are shown in Table 2 below.

TABLE 2

| Sample No. | Glass | | Size ($\mu m\phi$) | $\Delta n$ (%) | Production Method | $\lambda = 0.85$ $\mu$m Transmission Loss (dB/km) | Average Tensile Strength (kg/filament) | Tensile Strength after Immersion in Water (70° C. × 100 hr) |
|---|---|---|---|---|---|---|---|---|
| (1) | Core: | 32 wt % $GeO_2$—$SiO_2$ | 100 | 2.0 | OVPO | 6.0 | 5.5 | x |
|  | Cladding: | 20 wt % $B_2O_3$—$SiO_2$ | 140 | | | | | |
| (2) | Core: | 28 wt % $GeO_2$/ 6 wt % $P_2O_5$—$SiO_2$ | 100 | 1.9 | VAD | 5.8 | 5.0 | x |
|  | Cladding: | 22 wt % $B_2O_3$—$SiO_2$ | 140 | | | | | |
| (3) | Core: | 10 wt % $GeO_2$—$SiO_2$ | 100 | 2.0 | VAD | 4.0 | 7.0 | o |
|  | Cladding: | 2.5 wt % F—$SiO_2$ | 135 | | POD | | | |
|  | Jacket: | 5 wt % $TiO_2$—$SiO_2$ | 140 | | POD | | | |
| (4) | Core: | 12 wt % $GeO_2$—$SiO_2$ | 90 | 2.1 | Modified CVD | 3.5 | 6.5 | o |
|  | Cladding: | 2.5 wt % F/ 2 wt % $P_2O_5$—$SiO_2$ | 100 | | | | | |
|  | Jacket (a): | $SiO_2$ | 140 | | | | | |
|  | (b): | 5 wt % $TiO_2$—$SiO_2$ | 145 | | POD | | | |

"x" means poor, and "o" means good.

As Table 2 shows, the fiber of this invention suffers a transmission loss per kilometer ($\lambda = 0.85$ $\mu$m) of only 4.0 dB and its average tensile strength is as high as 6.0 kg per filament. It is worth noting that the fiber exhibits significantly increased tensile strength in water.

The advantages of the process of this invention for producing an optical fiber are summarized below.

(1) A fiber comprising a core of adequately large size, having a refractive index that greatly differs from that of the cladding, and the physical properties of which match those of the cladding and the jacket is provided.

(2) The ratio of dopant to $SiO_2$ glass in the core is less than half that conventionally required. The fiber produced has small loss due to Rayleigh scattering, hence low transmission loss.

(3) The glass of which the jacket is made becomes soft at the spinning temperature and provides a smooth surface. The resulting fiber has residual compressive stress left on the surface to provide high strength.

(4) With the jacket made of $SiO_2$, $ZrO_2$-$SiO_2$, $Al_2O_3$-$SiO_2$, $TiO_2$-$SiO_2$ or $HfO_2$-$SiO_2$, the fiber has a highly water-resistant surface.

(5) The reduced use of a dopant such as $GeO_2$, $B_2O_3$ or $P_2O_5$ results in a corresponding cost reduction.

While the invention has been described in detail and with reference to specific embodiments thereof, it will be apparent to one skilled in the art that various changes and modifications can be made therein without departing from the spirit and scope thereof.

What is claimed is:

1. A process for producing an optical transmission fiber comprising the steps of:
    (a) forming a transparent glass rod of a $GeO_2$-$SiO_2$ glass or $Sb_2O_3$-$SiO_2$ glass by the vapor-phase axial deposition process or the outside vapor-phase oxidation process,
    (b) overlaying the glass rod with a molten F-$SiO_2$ glass or F-$P_2O_5$-$SiO_2$ glass, to form a cladding layer on said glass rod,
    (c) further overlaying the cladding layer with a molten glass selected from the group consisting of $SiO_2$, $Al_2O_3$-$SiO_2$, $TiO_2$-$SiO_2$, $ZrO_2$-$SiO_2$, or $HfO_2$-$SiO_2$ to form a jacketed glass layer, and
    (d) melt-spinning the jacketed transparent glass rod into a fiber.

2. A process for producing an optical transmission fiber as in claim 1, wherein the molten fluorine containing-$SiO_2$ glass for overlaying the glass rod is produced by utilizing high frequency plasma.

3. The process according to claim 1, wherein
    step (a) comprises forming a transparent glass rod of a 10 wt. % $GeO_2$-$SiO_2$ glass by the vapor-phase axial deposition process,
    step (b) comprises overlaying the glass rod with a molten 2.5 wt. % F-$SiO_2$ glass by plasma outer deposition to form a cladding layer of 2.5 wt. % F-$SiO_2$ on said glass rod, and
    step (c) comprises further overlaying the cladding layer with a 5 wt. % $TiO_2$-$SiO_2$ molten glass by plasma outer deposition to form a jacketed glass layer.

4. A process for producing an optical transmission fiber comprising the steps of:
    (a) forming a layer of F-$SiO_2$ glass, or F-$P_2O_5$-$SiO_2$ glass, on the inner surface of an $SiO_2$ glass tube,
    (b) inserting within the resulting layered glass tube a transparent glass rod of $GeO_2$-$SiO_2$ glass or $Sb_2O_5$-$SiO_2$ glass,
    (c) collapsing the resulting structure to form an integral composite rod,
    (d) forming a molten layer of $Al_2O_3$-$SiO_2$, $TiO_2$-$SiO_2$, $Zr_{O2}$-$SiO_2$ or $HfO_2$-$SiO_2$ on the outer surface of the collapsed integral composite rod to provide a transparent glass rod preform, and
    (3) melt-spinning the preform into a fiber.

5. A process for producing an optical transmission fiber as in claim 4, wherein the fluorine containing-$SiO_2$ glass forming the layer on the inner surface of the $SiO_2$ glass tube is produced by utilizing high frequency plasma.

6. A process for producing an optical transmission fiber comprising the steps of:
    (a) forming a layer of 2.5 wt. % F-2 wt. % $P_2O_5$-$SiO_2$ glass on the inner surface of an $SiO_2$ glass tube,
    (b) inserting within the resulting F-$P_2O_5$-$SiO_2$ layered glass tube, a transparent glass rod of 10 wt. % $GeO_2$-$SiO_2$ glass,
    (c) collapsing the resulting structure to form an integral composite rod, and
    (d) melt-spinning the integral composite rod.

7. Process according to claim 6, and further comprising forming a molten layer of 5 wt. % $TiO_2$-$SiO_2$ on the outer surface of the integral composite rod before melt-spinning.

* * * * *